US007240283B1

(12) United States Patent
Paila et al.

(10) Patent No.: US 7,240,283 B1
(45) Date of Patent: Jul. 3, 2007

(54) DATA TRANSMISSION AND RENDERING TECHNIQUES IMPLEMENTED OVER A CLIENT-SERVER SYSTEM

(76) Inventors: Narasimha Rao Paila, 1735 Lawrence Rd., Apt. #218, Santa Clara, CA (US) 95051; Ajit Ramachandra Mayya, 13575 Lomond Ct., Saratoga, CA (US) 94070; Huy Nguyen, 10495 Dempster Ave., Cupertino, CA (US) 95014; Shannon Norrell, 914 N. Idaho St., San Mateo, CA (US) 94401

( * ) Notice: Subject to any disclaimer, the term of this patent is extended or adjusted under 35 U.S.C. 154(b) by 503 days.

(21) Appl. No.: 09/792,400

(22) Filed: Feb. 22, 2001

Related U.S. Application Data

(60) Provisional application No. 60/247,392, filed on Nov. 10, 2000.

(51) Int. Cl.

| | |
|---|---|
| ***G06F 15/00*** | (2006.01) |
| ***G06F 17/24*** | (2006.01) |
| ***G06F 15/16*** | (2006.01) |
| ***G06Q 30/00*** | (2006.01) |

(52) U.S. Cl. .................. 715/517; 715/501.1; 715/513; 709/203; 709/217; 705/26

(58) Field of Classification Search ................ 715/517, 715/501.1, 513, 526; 709/203, 217, 219; 705/26

See application file for complete search history.

(56) References Cited

U.S. PATENT DOCUMENTS

| | | | | |
|---|---|---|---|---|
| 2,781,643 | A | 2/1957 | Fairweather | |
| 3,406,532 | A | 10/1968 | Rownd et al. | |
| 3,670,867 | A | 6/1972 | Traube | |
| 4,213,310 | A | 7/1980 | Buss | |
| 4,455,453 | A | 6/1984 | Parasekvakos et al. | 379/106.06 |
| 4,656,591 | A | 4/1987 | Goldberg | |
| 4,799,156 | A | 1/1989 | Shavit et al. | |
| 4,887,208 | A | 12/1989 | Schneider et al. | |

(Continued)

FOREIGN PATENT DOCUMENTS

| | | |
|---|---|---|
| FR | 2696722 | 4/1994 |

(Continued)

OTHER PUBLICATIONS

Vass et al., "The World Wide Web—Everything you (n)ever wanted to know about its server", IEEE, Oct./Nov. 1998, pp. 33-37.*

(Continued)

*Primary Examiner*—William Bashore
*Assistant Examiner*—Maikhanh Nguyen

(57) ABSTRACT

A technique is disclosed for generating formatted information for display on a computer system. The computer system may be configured to include at least one interface for communicating with a server computer system. A request is sent from the computer system to the server system. According to one embodiment, the request may correspond to an HTTP request for information relating to a specific HTML page or web page. A response is then received from the server system. According to one embodiment, the response includes response information comprising embedded instructions and data. The embedded instructions may include instructions for using the data to generate formatted markup information for display on the computer system. The embedded instructions are then executed on the data to thereby generate formatted markup information for display on the computer system. According to a specific embodiment, the formatted markup information corresponds to HTML data to be rendered for display on the computer system.

39 Claims, 6 Drawing Sheets

U.S. PATENT DOCUMENTS 4,936,738 A 6/1990 Brennan
5,038,283 A 8/1991 Caveney
5,093,794 A 3/1992 Howie et al.
5,105,627 A 4/1992 Kurita
5,122,959 A 6/1992 Nathanson et al.
5,235,819 A 8/1993 Bruce
5,237,158 A 8/1993 Kern et al.
5,246,332 A 9/1993 Bernard
5,265,006 A 11/1993 Asthana
5,272,638 A 12/1993 Martin et al.
5,273,392 A 12/1993 Bernard
5,322,406 A 6/1994 Pippin et al.
5,363,310 A 11/1994 Haj-Ali Ahmadi et al.
5,395,206 A 3/1995 Cerny, Jr.
5,428,546 A 6/1995 Shah et al.
5,533,361 A 7/1996 Halpern
5,548,518 A 8/1996 Dietrich et al.
5,593,269 A 1/1997 Bernard
5,615,121 A 3/1997 Babayev et al.
5,666,493 A 9/1997 Wojcik et al.
5,694,551 A 12/1997 Doyle et al.
5,712,989 A 1/1998 Johnson et al.
5,758,313 A 5/1998 Shah et al.
5,758,328 A 5/1998 Giovannoli
5,761,673 A * 6/1998 Bookman et al. ........... 719/311
5,768,139 A 6/1998 Pippin et al.
5,809,479 A 9/1998 Martin et al.
5,826,242 A * 10/1998 Montulli ...................... 705/27
5,826,825 A 10/1998 Gabriet
5,831,860 A 11/1998 Foladare et al.
5,832,457 A 11/1998 Cherney
5,834,753 A 11/1998 Danielson et al.
5,835,914 A * 11/1998 Brim .......................... 707/206
5,839,117 A 11/1998 Cameron et al.
5,848,395 A 12/1998 Edgar et al.
5,878,401 A 3/1999 Joseph
5,880,443 A 3/1999 McDonald et al.
5,893,076 A 4/1999 Hafner et al.
5,894,554 A * 4/1999 Lowery et al. ............ 709/203
5,897,622 A 4/1999 Blinn et al.
5,897,629 A 4/1999 Shinagawa et al.
5,899,088 A 5/1999 Purdum
5,910,896 A 6/1999 Hahn-Carlson
5,918,213 A 6/1999 Bernard et al.
5,943,652 A 8/1999 Sisley et al.
5,943,841 A 8/1999 Wunscher
5,956,709 A 9/1999 Xue
5,961,601 A * 10/1999 Iyengar ...................... 709/203
5,963,919 A 10/1999 Brinkley et al.
5,979,757 A 11/1999 Tracy et al.
6,023,683 A 2/2000 Johnson et al.
6,061,607 A 5/2000 Bradley et al.
6,070,147 A 5/2000 Harms et al.
6,073,108 A 6/2000 Peterson
6,081,789 A 6/2000 Purcell
6,083,279 A 7/2000 Cuomo et al.
6,085,170 A 7/2000 Tsukuda
6,101,481 A 8/2000 Miller
6,140,922 A 10/2000 Kakou
6,185,625 B1 * 2/2001 Tso et al. ................... 709/247
6,215,952 B1 4/2001 Yoshio et al. ................. 386/94
6,233,543 B1 5/2001 Butts et al.
6,249,801 B1 6/2001 Zisapel et al.
6,260,024 B1 7/2001 Shkedy
6,275,812 B1 8/2001 Haq et al.
6,289,260 B1 9/2001 Bradley et al.
6,289,370 B1 * 9/2001 Panarello et al. ........... 709/200
6,292,784 B1 9/2001 Martin et al. ................. 705/11
6,324,520 B1 11/2001 Walker et al.
6,332,334 B1 12/2001 Faryabi
6,341,269 B1 1/2002 Dulaney et al.
6,343,275 B1 1/2002 Wong
6,397,246 B1 * 5/2002 Wolfe ......................... 709/217
6,405,173 B1 6/2002 Honarvar et al.
6,424,947 B1 7/2002 Tsuria et al.
6,445,976 B1 9/2002 Ostro
6,453,306 B1 9/2002 Quelene
6,463,345 B1 10/2002 Peachey-Kountz et al. ... 700/99
6,463,420 B1 10/2002 Guidice et al.
6,490,567 B1 12/2002 Gregory
6,496,205 B1 * 12/2002 White et al. ................ 715/824
6,505,093 B1 1/2003 Thatcher et al.
6,505,171 B1 1/2003 Cohen et al.
6,526,392 B1 2/2003 Dietrich et al.
6,530,518 B1 3/2003 Krichilsky et al.
6,567,786 B1 5/2003 Bibelnieks et al.
6,571,213 B1 5/2003 Altendahl et al.
6,578,005 B1 6/2003 Lesaint et al.
6,598,027 B1 7/2003 Breen, Jr.
6,622,127 B1 9/2003 Klots et al.
6,654,726 B1 11/2003 Hanzek
6,697,964 B1 * 2/2004 Dodrill et al. ................ 714/38
6,741,995 B1 5/2004 Chen et al.
6,748,418 B1 * 6/2004 Yoshida et al. ............. 709/204
6,763,496 B1 * 7/2004 Hennings et al. ........ 715/501.1
6,862,572 B1 3/2005 de Sylva
6,879,965 B2 * 4/2005 Fung et al. ................... 705/39
6,970,837 B1 11/2005 Walker et al. ................ 705/26
6,990,460 B2 1/2006 Parkinson .................... 705/10
2001/0037229 A1 11/2001 Jacobs et al. .................. 705/8
2001/0042021 A1 11/2001 Matsuo et al.
2001/0047285 A1 11/2001 Borders et al.
2001/0047310 A1 11/2001 Russell ........................ 705/26
2001/0049619 A1 12/2001 Powell et al.
2001/0049672 A1 12/2001 Moore
2002/0004766 A1 1/2002 White
2002/0007299 A1 1/2002 Florence ........................ 705/9
2002/0013950 A1 1/2002 Tomsen
2002/0038224 A1 3/2002 Bhadra .......................... 705/1
2002/0049853 A1 * 4/2002 Chu et al. ................... 709/237
2002/0065700 A1 5/2002 Powell et al.
2002/0188530 A1 12/2002 Wojcik et al.
2002/0194087 A1 12/2002 Spiegel et al. ................ 705/26
2003/0045340 A1 3/2003 Roberts
2003/0079227 A1 4/2003 Knowles et al. .............. 725/50
2003/0233190 A1 12/2003 Jones
2004/0236635 A1 11/2004 Publicover
2005/0027580 A1 2/2005 Crici et al. .................... 705/8
2005/0144641 A1 6/2005 Lewis ......................... 725/60

FOREIGN PATENT DOCUMENTS

GB 2 265 032 A 9/1993
WO WO99/07121 2/1999

OTHER PUBLICATIONS

Wunnava et al., “Interactive Multimedia on the World Wide Web”, IEEE, Aug. 1999, pp. 110-115.*

Tim R. Norton, “End-To-End Response-Time: Where to Measure?”, Computer Measurement Group Conference Proceedings, CMG99 Session 423, Dec. 1999, pp. 1-9.*

T. Berners-Lee et al., “Hypertext Transfer Protocol—http/1.1 RFC 2616”, Network Working Group, Jun. 1999, pp. 1-90.*

Anupindi et al., “Estimation of Consumer Demand with Stock-Out Based Substitution: An Application to Vending Machine Product”, Marketing Science, vol. 17, No. 4, 1998, pp. 406-423.

Automatic ID News, “20/20 Results Achieved with Technology Trio”, Sep. 1995, p. 19.

Fynes, Brian, et al., The Impact of Electronic Data Interchange on Competitiveness in Retail Supply Chain, IBAR v14n2 pp. 16-22 1993.

Kawata, Hiroo “Information Technology of Commercial Vehicles in the Japanese Parcel Service Business,” Abstract No., XP-000560489, 1992, pp. 371-382.

Koster, Rene de, "Routing Orderpickers in a Warehouse: A Comparison Between Optimal and Heuristic Solutions," IIE Transactions, vol. 30, No. 5, p. 469, May 1998.
Maloney, David, "The New Corner Drugstore", May 1, 2000, Modern Materials Handling, vol. 55, No. 5, p. 58.
PC Foods, "Customer Service Agreement," printed from website: http://www.pcfoods.com, Abstract No., XP-002245026, 1999, pp. 1-2.
Sekjta, Takashi "The Physical Distribution Information Network in the Home-Delivery Business," Japan Computer Quarterly, Abstract No. XP-00.431194, 1990, pp. 23-32.
Smith et al., "Management of Multi-Item Retail Inventory Systems with Demand Susbtitution", Operations Research, vol. 48, No. 1, January-February, pp. 50-64.
Towie, Henry "On the Fast Track with Totaltracks: UPS Deploys Mobile Date Service," Abstract No. XP-000560076, Document Delivery World, vol. 9, No. 3, 1993, pp. 30-31.
Van Den Berg, Jeroen P., "A Literature Survey on Planning and Control of Warehousing Systems", IIE Transactions vol. 31, No. 3, p. 751, Aug. 1999.
Wilson, Joe, "Selecting Warehouse Management Software (WMS) for Food Distribution Operations", Frozen Food Digest, Oct. 1998, vol. 14, No. 1, p. 18.
U.S. Appl. No. 09/568,570, filed May 10, 2000.
U.S. Appl. No. 09/568,571, filed May 10, 2000.
U.S. Appl. No. 09/568,572, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/750,385, filed Dec. 27, 2000.
U.S. Appl. No. 09/813,235, filed Mar. 19, 2001.
"Peapod Interactive Grocery Shopping and Delivery Service Now Delivers Via the Internet", Press Release, peapod.com, Apr. 22, 1996, pp. 1-2.
Hyten, Todd, "Stop & Shop mulls online grocery store", Boston Business Journal (Boston, MA, US), Mar. 22, 1996, vol. 16, No. 6, p. 1.
Pearce, Micheal R. "Form carts to clicks", Ivey Business Quarterly, Autumn 1998, vol. 63, No. 1, p. 69-71.
Worth Wren Jr., Fort Worth Star-Telegram Texas, "Albertson's Expects Online Grocery Shopping To Boom", KRTBN Knight-Ridder Tribune Business News (Fort Worth Star-Telegram, Texas), Nov. 9, 1998.
www.peapod.com, including Introduction to Peapod: How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

* cited by examiner

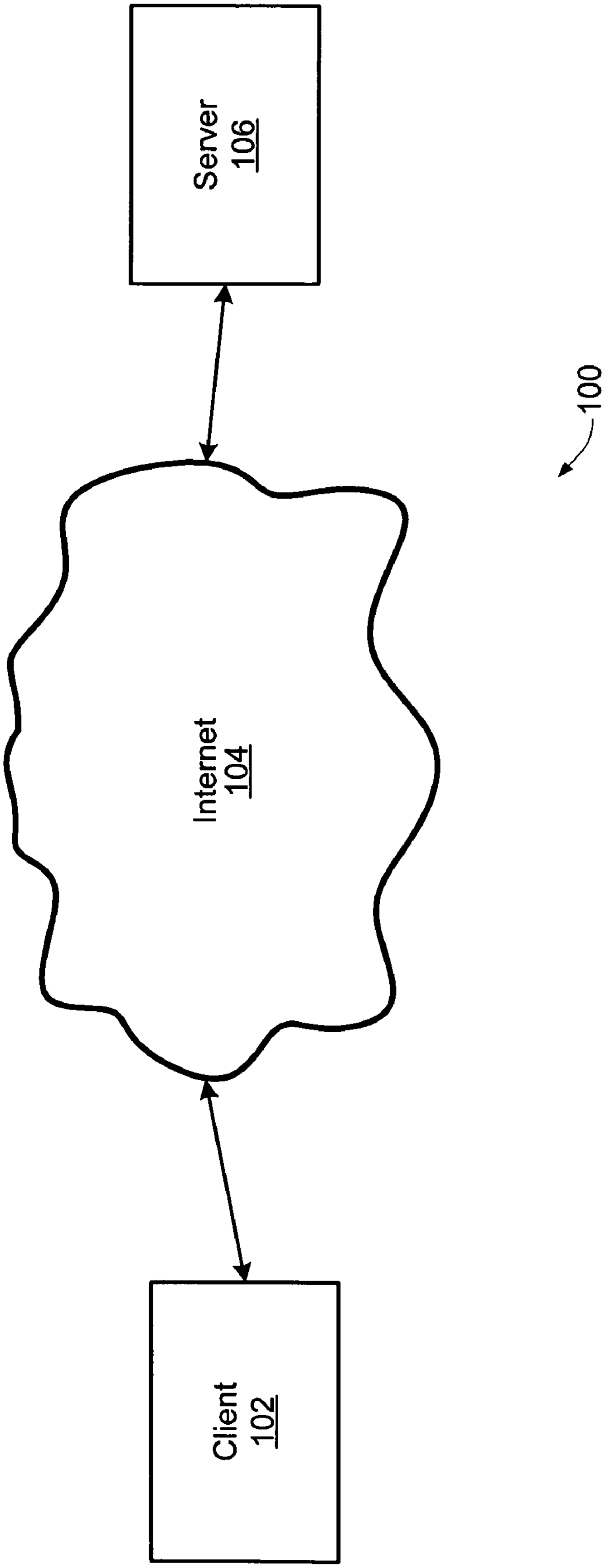
Fig. 1 [Prior Art]

202 — Bryan's contact number is (408) 123-4567. If you want to send a fax, please use (650) 123-3232
Click here to send e-mail to Bryan 204 — Dean's contact number is (408) 456-7685. If you want to send a fax, please use (650) 123-4568
Click here to send e-mail to Dean 206 — Ajit's contact number is (408) 567-8585. If you want to send a fax, please use (650) 123-3232
Click here to send e-mail to Ajit 208 — Narasimha's contact number is (408) 567-3421. If you want to send a fax, please use (650) 123-4569
Click here to send e-mail to Narasimha

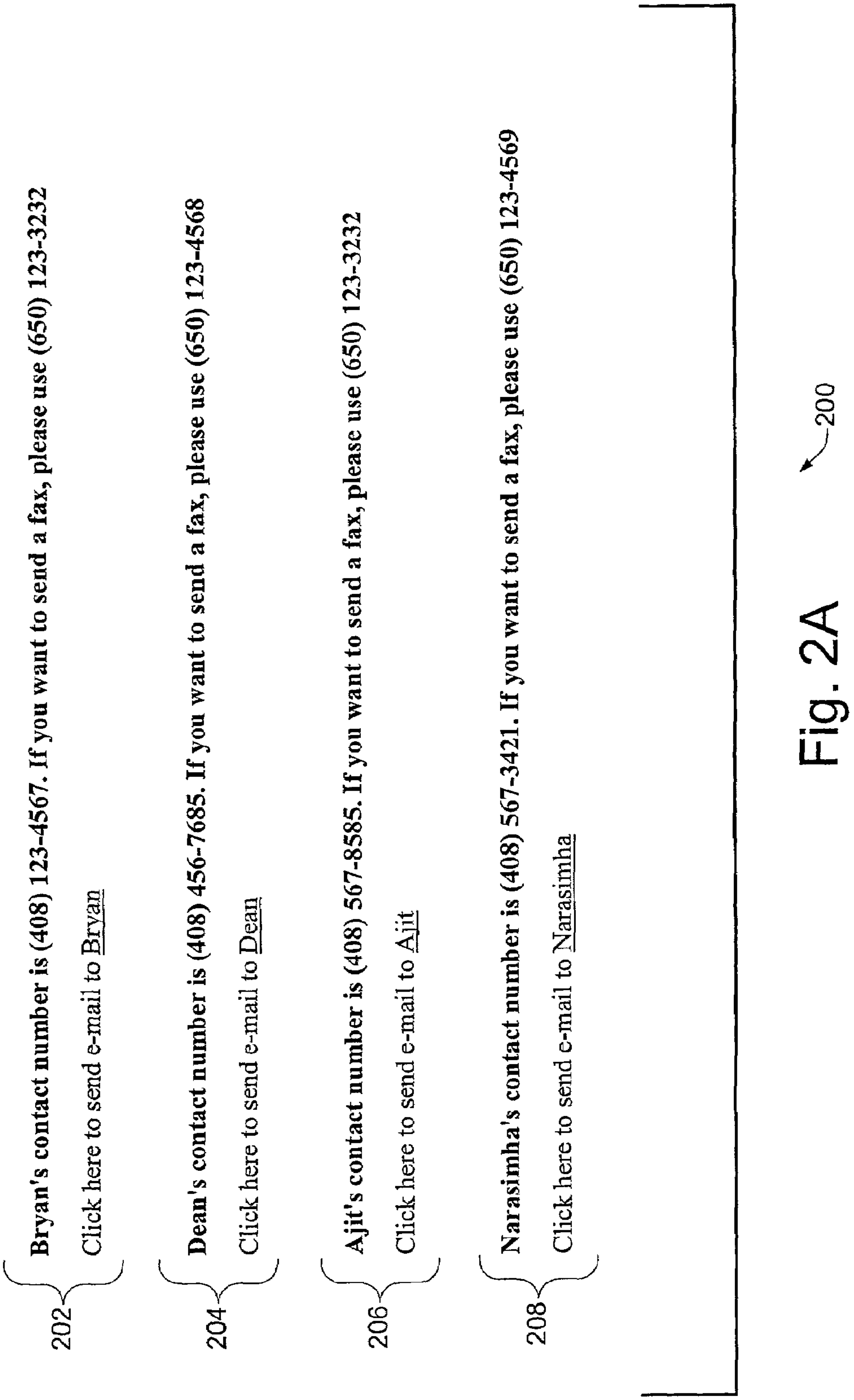

Fig. 2A

```
    <HTML>
    <HEAD>
    <META HTTP-EQUIV="Content-Type" CONTENT="text/html; charset=windows-1252">
    <META NAME="Generator" CONTENT="Microsoft Word 97">
    <TITLE>Figure 2B</TITLE>
    <META NAME="Version" CONTENT="8.0.3410">
    <META NAME="Date" CONTENT="10/11/96">
    <META NAME="Template" CONTENT="C:\Program Files\MSOffice\Office\HTML.DOT">
    </HEAD>
    <BODY TEXT="#000000" LINK="#0000ff" BGCOLOR="#ffffff">
    <TABLE CELLSPACING=0 BORDER=0 WIDTH=672>
    <TR><TD VALIGN="MIDDLE">
    <P><STRONG>Bryan's contact number is (408) 123-4567. If you want to send a fax, please use (650) 123-3232</STRONG></TD>
212 </TR>
    <TR><TD VALIGN="MIDDLE">
    <P>Click here to send e-mail to <A HREF="mailto:Bryan@webvangroup.com">Bryan</A></TD>
    </TR>
    </TABLE><p>
    <TABLE CELLSPACING=0 BORDER=0 WIDTH=672>
    <TR><TD VALIGN="MIDDLE">
214 <P><STRONG>Dean's contact number is (408) 456-7685. If you want to send a fax, please use (650) 123-4568</STRONG></TD>
    </TR>
    <TR><TD VALIGN="MIDDLE">
    <P>Click here to send e-mail to <A HREF="mailto:Dean@webvangroup.com">Dean</A></TD>
    </TR>
    </TABLE><p>
    <TABLE CELLSPACING=0 BORDER=0 WIDTH=672>
    <TR><TD VALIGN="MIDDLE">
216 <P><STRONG>Ajit's contact number is (408) 567-8585. If you want to send a fax, please use (650) 123-3232</STRONG></TD>
    </TR>
    <TR><TD VALIGN="MIDDLE">
    <P>Click here to send e-mail to <A HREF="mailto:Ajit@webvangroup.com">Ajit</A></TD>
    </TR>
    </TABLE><p>
    <TABLE CELLSPACING=0 BORDER=0 WIDTH=672>
    <TR><TD VALIGN="MIDDLE">
218 <P><STRONG>Narasimha's contact number is (408) 567-3421. If you want to send a fax, please use (650) 123-4569</STRONG></TD>
    </TR>
    <TR><TD VALIGN="MIDDLE">
    <P>Click here to send e-mail to <A HREF="mailto:Narasimha@webvangroup.com">Narasimha</A></TD>
    </TR>
    </TABLE>
    <P> </P>
    <P> </P></BODY>
    </HTML>
```

Fig.2B [Prior Art]

```
<HTML>
<HEAD>
        <META HTTP-EQUIV="Expires" CONTENT="Tue, 01 Jan 1980 1:00:00 GMT">
        <META HTTP-EQUIV="Pragma" CONTENT="no-cache">
        <TITLE>Figure 2C</TITLE>
        <Script Language="Javascript">
        function G(N,T,F) {
        var t="<table><tr><td>";
222     t += "<strong> " + N + "</bold>" + "\'s contact number is <strong>" + T + ". If you want to send a fax, please use " + F +
        "</td></tr><tr><td>  Click here to send e-mail to <a HREF=\"mailto:" + N + "@webvangroup.com\">" + N +
        "</a></td></tr></tr></Table><br>";
        return t;
        }
        </Script>
</HEAD>
<BODY BGCOLOR="#FFFFFF" vlink=blue link=blue MARGINWIDTH=0 MARGINHEIGHT=0>
            <Script Language="Javascript">
            S = "";
224         S += G("Bryan", "(408) 123-4567", "(650) 123-3232"); S += G("Dean", "(408) 456-7685", "(650) 123-4568");
            S += G("Ajit", "(408) 567-8585", "(650) 123-3232"); S += G("Narasimha", "(408) 567-3421", "(650) 123-4569");
            document.write(S);
            </script>
</BODY>
</HTML>
```

Fig. 2C

DATA TRANSMISSION AND RENDERING TECHNIQUES IMPLEMENTED OVER A CLIENT-SERVER SYSTEM

RELATED APPLICATION DATA

The present application claims priority under 35 USC 119(e) from U.S. Provisional Patent Application No. 60/247,392 filed Nov. 10, 2000, the entirety of which is incorporated herein by reference for all purposes. The present application also relates to copending U.S. patent application Ser. No. 09/568,603, filed on May 10, 2000, which is incorporated herein by reference in its entirety for all purposes.

BACKGROUND OF THE INVENTION

The present invention relates generally to data networks, and more specifically to data transmission and rendering techniques to be implemented in a client-server system.

FIG. 1 shows a block diagram of a typical client-server system 100, wherein the client device 102 and the server device 106 communicate with each other via the Internet 104.

In most Internet-based client-server systems, when a client process 102 desires specific information from a remote server (such as, for example, a web page), the client process transmits an HTTP request to the server 106 (via Internet 104), and the server responds by transmitting an HTTP response to the client which includes HTML data. A browser on the client machine renders the HTML data and displays it to the user in the form of an HTML (i.e. web) page. This entire process may be initiated by the user at the click of a button, such as, for example, by clicking a mouse button on a URL link. However, the desired information will typically not be displayed instantaneously. Rather, the user typically is required to wait a time interval (referred to as the end-user experienced response time) until the desired information is retrieved from the server system and displayed on the client machine. This delay is undesirable. Accordingly, it will be appreciated that it is generally desirable to reduce the end-user experienced response time.

SUMMARY OF THE INVENTION

According to different embodiments of the present invention, a method and computer program product are disclosed for generating formatted information for display on a computer system. The computer system may be configured to include at least one interface for communicating with a server computer system. A request is sent from the computer system to the server system. According to one embodiment, the request may correspond to an HTTP request for information relating to a specific HTML page or web page. A response is then received from the server system. According to one embodiment, the response includes response information comprising embedded instructions and data. The embedded instructions may include instructions for using the data to generate formatted markup information for display on the computer system. The embedded instructions are then executed on the data to thereby generate formatted markup information for display on the computer system. According to a specific embodiment, the formatted markup information corresponds to HTML data to be rendered for display on the computer system.

Other embodiments are directed to a method and computer program product for generating formatted information for display on a computer system. The computer system may be configured to include at least one interface for communicating with a server computer system. A request for desired information is received from the computer system. According to one embodiment, the request may correspond to an HTTP request for information relating to a specific HTML page or web page. A response is then sent to the computer system. According to one embodiment, the response includes response information comprising embedded instructions and data. The embedded instructions may include instructions for using the data to generate formatted markup information for display on the computer system. According to a specific embodiment, the formatted markup information corresponds to HTML data to be rendered for display on the computer system.

An alternate embodiment of the present invention is directed to a system for generating formatted information for display on a computer system. The system comprises at least one CPU, memory, and at least one interface for communicating with a server computer system. The system may be configured to send a request to the server system via the at least one interface. According to one embodiment, the request may correspond to an HTTP request for information relating to a specific HTML page or web page. The system may further be configured to receive a response from the server system, wherein the response includes response information comprising embedded instructions and data. The embedded instructions may include instructions for using the data to generate formatted markup information for display on the computer system. The system may be further configured to execute the embedded instructions on the data to thereby generate formatted markup information for display on the computer system. According to a specific embodiment, the formatted markup information corresponds to HTML data to be rendered for display on the computer system.

Another embodiment of the present invention is directed to a system for generating formatted information for display on a computer system. The system comprises at least one CPU, memory, and at least one interface for communicating with a client computer system. The system may be configured to receive a request for desired information from the client computer. According to one embodiment, the request may correspond to an HTTP request for information relating to a specific HTML page or web page. The system may further be configured or designed to send a response to the client computer, wherein the response includes response information comprising embedded instructions and data. The embedded instructions may include instructions for using the data to generate formatted markup information for display on the client system. According to a specific embodiment, the formatted markup information corresponds to HTML data to be rendered for display on the client system.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 shows a block diagram of a conventional client-server system 100.

FIG. 2A shows an example of an HTML page which may be used to illustrate the data transmission and rendering techniques of the present invention.

FIG. 2B shows an example of conventional HTML source code which may be provided by a conventional server to a conventional client device in response to an HTTP request.

FIG. 2C illustrates a specific embodiment of the source code which may be provided by a server to a client device in accordance with a specific embodiment of the present invention.

DESCRIPTION OF THE PREFERRED EMBODIMENT

Figure 3:
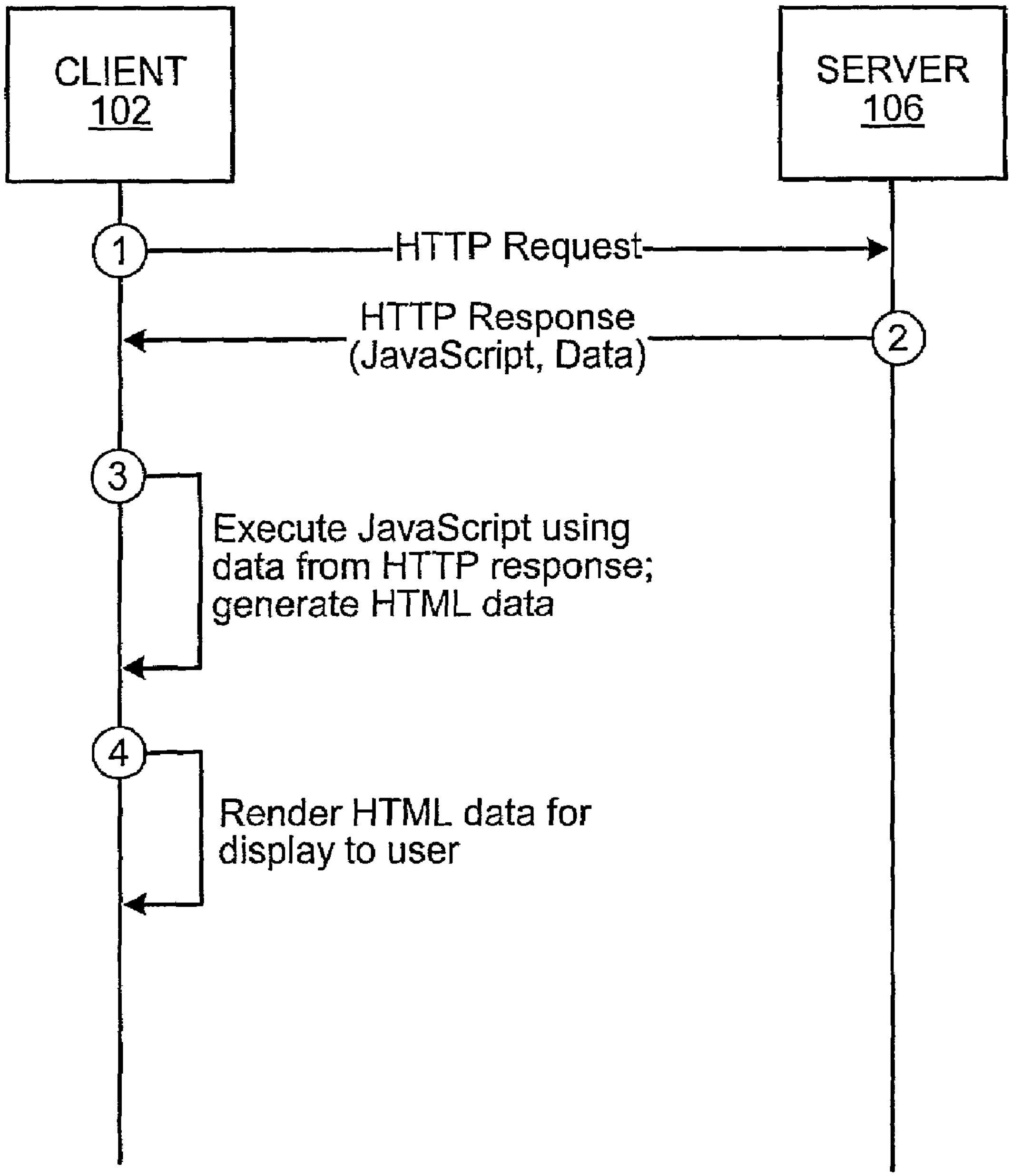
FIG. 3 shows a flow diagram illustrating how information is transmitted between a client system and a server system in accordance with a specific embodiment of the present invention.

This application describes various features associated with data transmission and rendering techniques to be implemented in a client-server system. It will be appreciated, therefore, that the data transmission and rendering techniques described in this application merely define specific embodiments of the data transmission and rendering techniques of the present invention. Alternate embodiments of the data transmission and rendering techniques of the present invention may be derived by modifying various features of the specific embodiment described herein. Such modifications will be apparent to one having ordinary skill in the art.

As described previously in the Background Section of this application, it is generally desirable to reduce the end-user experienced response time as much as possible. In this regard, it will be appreciated that a combination of different factors may contribute to the overall end-user experienced response time, such as, for example, the server response time, communication latency, download time, client processing speed, etc. The server response time indicates how quickly a server is able to respond to a particular request, such as, for example, an HTTP request. The communication latency represents the start up costs associated with the connection between the client and the server. Typically, each time the user clicks on a particular link in a web browser application, a connection to a server is established, which incurs another latency period. The client processing speed corresponds to how quickly the client (or browser machine) is able to render the page as it receives it. The download time represents an amount of time that it takes to download a requested page once the request has been received and processed by the server. This value may be significantly affected by the connection speed that has been established between the client and the server.

With the limited connection speeds that are typically established between the client and the server, one of the more significant factors in the end-user experienced response time is the size of the page being downloaded. Thus, it will be appreciated that, by reducing the amount of bytes to be downloaded from the server process, the end-user experienced response time may also be reduced.

FIG. 2A shows an example of an HTML page which may be used to illustrate the data transmission and rendering techniques of the present invention. The HTML page 200 of FIG. 2A represents the web page which is displayed to a user of the client device 102. In the example of FIG. 2A, it is assumed that the web page 200 represents a phone book page which includes personalized contact information specific to that user. For example, a first entry 202 on page 200 provides personalized information for a contact named Bryan. A second entry 204 on page 200 provides personalized information for a contact named Dean. A third entry 206 on page 200 provides personalized information for a contact named Ajit. A fourth entry 208 on page 200 provides personalized information for a contact named Narasimha.

FIG. 2B shows an example of conventional HTML source code which may be provided by the server 106 to the client device 102, and subsequently used by a conventional web browser (such as, for example, Netscape Navigator or Internet Explorer) on the client device for rendering the web page 200. As illustrated in FIG. 2B, each entry 212, 214, 216 and 218 in the HTML source code corresponds to a respective entry 202, 204, 206, 208 displayed on web page 200. Moreover, it will be appreciated that each character of text which is displayed on the web page 200 is included in the HTML source code of FIG. 2B.

FIG. 2C illustrates a specific embodiment of modified source code which may be provided by the server 106 to the client device 102, and subsequently used for rendering the HTML page 200 in accordance with a specific embodiment of the present invention. As shown in FIG. 2C, the source code includes an embedded instruction portion 222 and an embedded data portion 224. In the example of FIG. 2C, it is assumed that the embedded instruction portion 222 is implemented using a scripting language such as, for example, JavaScript, and that the client web browser is capable of executing the embedded instructions. When compared to the source code of FIG. 2B, it can be seen at the source code of FIG. 2C includes fewer bytes of information. For example, it can be seen that the characters "If you want to send a fax, please use" are repeated four (4) times in FIG. 2B, but are included only once in FIG. 2C. The data portion 224 includes all the customized data which will eventually be rendered into customized HTML data.

It will be appreciated that the actual number of bytes to be transferred from the server 106 to the client device 102 in FIG. 2B is significantly greater than that of FIG. 2C. More specifically, the byte size of the data represented by FIG. 2B is 1,730 bytes, whereas the byte size of the data represented by FIG. 2C is 960 bytes.

Thus, according to at least one embodiment of the present invention, rather than the server 106 sending the entire HTML source code (as shown in FIG. 2B) to the client machine 102, the server may transmit embedded instructions and data (as shown in FIG. 2C) to the client machine, wherein the embedded instructions and data are processed at the client machine to thereby generate HTML data to be rendered for displaying to a user.

FIG. 3 shows a flow diagram illustrating how information is transmitted between a client system 102 and a server system 106 in accordance with a specific embodiment of the present invention. It will be appreciated that the flow diagram of FIG. 3 merely represents an example of a specific embodiment of how the technique of the present invention may be used to reduce the amount of actual bytes transferred from a server device to a client device.

Referring to FIG. 3, it is initially assumed that the client transmits (1) an HTTP request to the server 106. For purposes of illustration, it is assumed that the HTTP request corresponds to a request to retrieve web page 200 of FIG. 2A. The server responds (2) by transmitting an HTTP response to the client machine. According to a specific embodiment, the HTTP response includes embedded instructions and data such as that shown, for example in FIG. 2C. According to a specific implementation, the embedded data may be in ASCII text format. The embedded data may also be in other forms, such as, for example, Unicode. Additionally, according to specific embodiments, the embedded instructions may correspond to scripting language which can be interpreted by a browser or other rendering program, or alternatively, may correspond to executable code, such as, for example, a plug-in, which may be executed on at the client system 102. In the example of FIG. 3, it is assumed that the embedded instructions are implemented using JavaScript.

Upon receiving the HTTP response, the client machine may execute (3) the JavaScript on the data provided in the HTTP response to thereby generate HTML code for rendering on the client machine. According to a specific embodiment, this action may be performed by a browser application that has been configured or designed to interpret scripting instruction language such as, for example, JavaScript or JSCRIPT. Alternatively, the embedded instructions may correspond to executable code which is executed on the client system using the data from the HTTP response to generate the HTML code. A web browser or other rendering program on the client machine may than use the generated HTML code to render (4) the HTML page to be displayed on the client machine's display device.

It will be appreciated that, according to a specific embodiment of the present invention, the response transmitted from the server 106 to the client system 102 may not always include both embedded instructions and embedded data. In one implementation, the particular request transmitted by the client system to the server may be used by the server determine whether the response to the client should include only data, or both data and instructions.

By way of illustration, it is assumed that the server 106 has already transmitted a first response to client 102 which includes embedded instructions 222 and data 224 as shown in FIG. 2C. Further, it is assumed that a browser program has executed the instructions 222 on the data 224 to generate HTML data, which the browser program then rendered for display as shown in FIG. 2A. Additionally, in this example, it is assumed that the rendered page includes two additional links (not illustrated in FIG. 2A). The first link is displayed as "VIEW CALENDAR", and the second link is displayed as "NEXT PAGE". If the user clicks on the NEXT PAGE link, the client system will send a request to the server to retrieve the next page of contact information. When the server receives this request, it may determine from the request that it need only send the data portion relating to the next page of contact information. The client system has previously received the embedded instructions 222 for rendering the next page data. Thus, when the client system subsequently receives a response from the server which includes the next page data portion (but does not include the embedded instructions portion), the client machine may execute the previously received instructions 222 on the newly received data to thereby render the next page of contact information for display to the user.

Alternatively, if the user clicks on the VIEW CALENDAR link, the client system will send a request to the server to retrieve calendar information (which is assumed to be displayed using a different format than that shown in FIG. 2A). When the server receives this request, it may determine from the request that it needs to send both new data (i.e. calendar data) and new instructions (for rendering the calendar data) to the client system. Upon receiving the response from the server, the client system may then execute new instructions on the calendar data to thereby generate HTML data to be rendered for display to the user.

From the above description, it will be appreciated that the data transmission and rendering techniques of the present invention may be used to reduce the amount of actual bytes transferred from a server system (e.g., 106, FIG. 1) to a client system (e.g., 102, FIG. 1) in response to a specific client request. In this way the technique of the present invention may significantly improve the end-user experienced response time by reducing the amount of actual bytes which need to be received at the client machine, for example, during a single request-response transaction. Moreover, it will be appreciated that the technique of the present invention may be utilized in environments where connection speed is a significant factor in the end-user experienced response time.

Generally, the data transmission and rendering techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the data transmission and rendering technique of this invention may be implemented on a general-purpose programmable machine selectively activated or reconfigured by a computer program stored in memory. Such programmable machine may be a computer system or network device such as that shown in FIG. 4 of the drawings. The network device may have multiple network interfaces including, for example, frame relay, Ethernet, ISDN, etc. Specific examples of such a network device include routers and servers. A general architecture for some of these machines will appear from the description given below. In an alternative embodiment, the data transmission and rendering technique of this invention may be implemented on a general-purpose network host machine such as a personal computer or workstation. Further, the invention may be at least partially implemented on a card (e.g., an interface card) for a network device or a general-purpose computing device.

Figure 4:
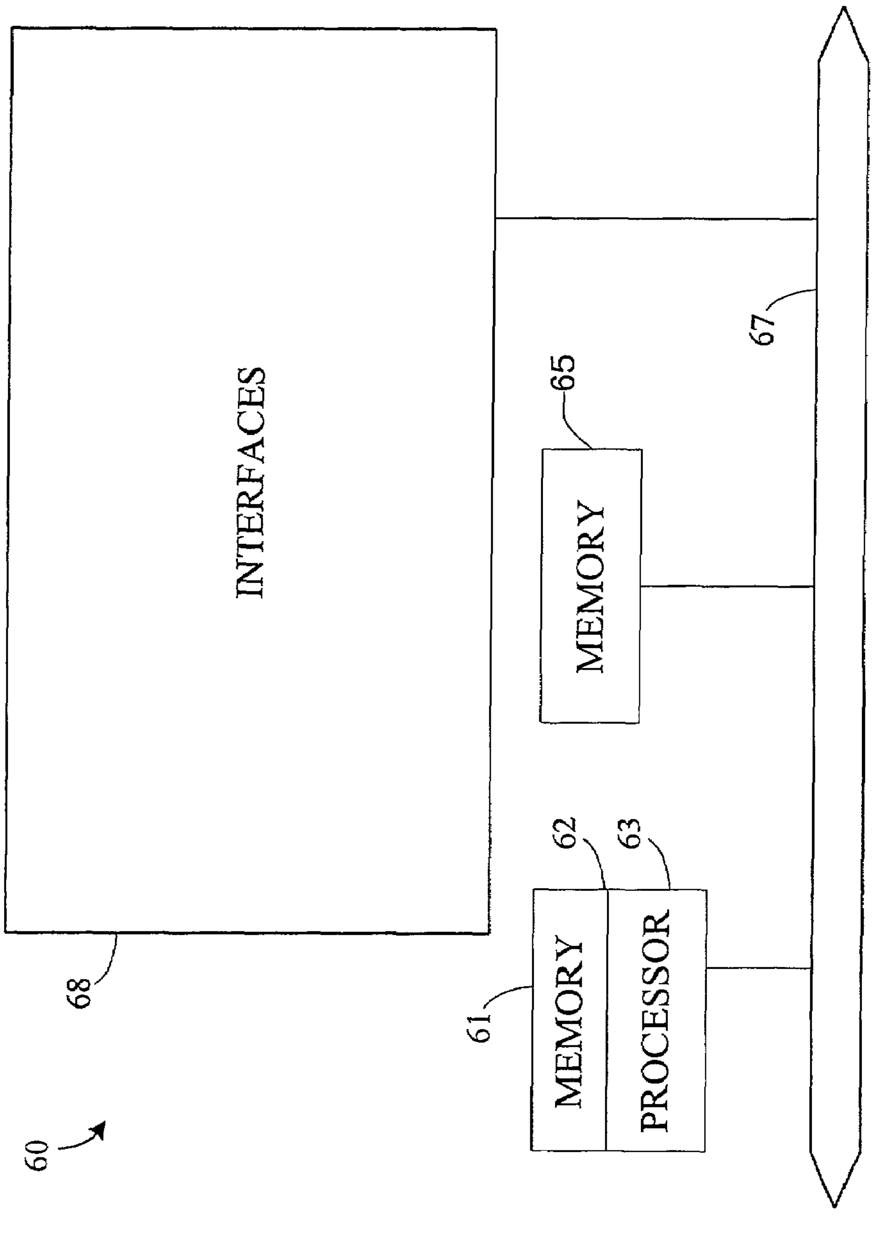
FIG. 4 shows a network device 60 suitable for implementing the data transmission and rendering techniques of the present invention.

Referring now to FIG. 4, a network device 60 suitable for implementing the data transmission and rendering techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a client network device, the CPU 62 may be responsible for such tasks as transmitting and receiving information to and from other network devices, analyzing received information, executing JavaScript, generating HTML data using non-HTML data received from another network device, rendering HTML data for display to a user, etc. The CPU 62 preferably accomplishes all these functions under the control of software including an operating system (e.g., Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the data transmission and rendering techniques described herein. The program instructions may control the operation of an operating system and/or one or more applications, for example. The memory or memories may also be configured to include data structures which store data received from other network devices, locally generated HTML data, rendered HTML pages, etc.

Because such information and program instructions may be employed to implement the systems/methods described herein, the present invention relates to machine readable media that include program instructions, state information, etc. for performing various operations described herein. Examples of machine-readable media include, but are not limited to, magnetic storage media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in transmission media such as a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as described herein.

It is claimed:

1. A computer-implemented method for generating formatted information for display on a computer system, the computer system including at least one interface for communicating with a server system, the method comprising:

sending, by the computer system, a request to the server system via the at least one user interface for displaying formatted markup information on the computer system;

sending, by the computer system, a response from the server system, the response including response information comprising instructions and data to generate formatted markup information for display on the computer system; and executing, by the computer system, the instructions on the data to thereby generate formatted markup information for display on the computer system;

wherein the byte size of the instructions and data is less than the byte size of the formatted markup information, which, in turn, improves a response time of the computer system, and wherein the method further comprises sending, by the computer system, another request to the server system via the at least one interface for displaying additional formatted markup information on the computer system, receiving, by the computer system, instead of the additional formatted markup information, another response from the server system, the another response including information comprising another set of data, which, when used by the instructions, generates the additional formatted markup information for display on the computer system; and executing, by the computer system, the instructions on the another set of data to thereby generate the additional formatted markup information for display on the computer system, wherein ordering transactions of items selected by a customer are facilitated via the computer-implemented method, with the at least one interface being a customer interface, wherein the information received by the computer system includes information regarding an item for the customer to select by placing a customer order through the customer interface, wherein the customer order includes delivery timing information, wherein the customer is associated with a geographic area, and wherein at least one item for the customer to select to include the customer order depends on the geographic area associated with the customer.

2. The method of claim 1 wherein said formatted markup information is generated at the computer system without further communication from the server system.

3. The method of claim 1 wherein said request corresponds to an HTTP request and said response corresponds to an HTTP response generated in response to said HTTP request.

4. The method of claim 1 wherein the formatted information is formatted according to a standard generalized markup language (SGML).

5. The method of claim 1 wherein the formatted information corresponds to hypertext markup language (HTML) code.

6. The method of claim 1 wherein the instructions include instructions formatted in accordance with a scripting language.

7. The method of claim 6 wherein the scripting language is JavaScript.

8. The method of claim 1 wherein the instructions include JavaScript code, and wherein the method further comprises executing the JavaScript code on the data to thereby generate HTML data to be rendered for display on the computer system.

9. The method of claim 1 wherein the response information is not in a format which may be used by a browser application for rendering the response information for display on the computer system.

10. The method of claim 1 further comprising rendering the formatted markup information, using a browser application, for display on the computer system.

11. A computer system for generating formatted information for display, the computer comprising:

at least one CPU;

memory; and at least one interface for communicating with a server system;

the computer system being configured or designed to send a request to the server system via the at least one interface for displaying formatted markup information on the computer system;

the computer system further being configured or designed to a response from the server system, the response including response information comprising instructions and data to generate formatted markup information for display on the computer system; and the computer system being further configured or designed to execute the instructions on the data to thereby generate formatted markup information for display on the computer system;

wherein the byte size of the instructions and data is less than the byte size of the formatted markup information, which, in turn, improves a response time of the computer system, and wherein the computer system is further being configured or designed to sending another request to the server system via the at least one interface for displaying additional formatted markup information on the computer system, receiving another response from the server system, the another response including information comprising another set of data, which, when used by the instructions, generates the additional formatted markup information for display on the computer system; and execute the instructions on the another set of data to thereby generate the additional formatted markup information for display on the computer system, wherein the computer system is further being configured to facilitate ordering transactions of items selected by a customer, with the at least one interface being a customer interface, wherein the information received by the computer system includes information regarding an item for the customer to select by placing a customer order through the customer interface, wherein the customer order includes delivery timing information, wherein the customer is associated with a geographic area, and wherein at least one item for the customer to select to include the customer order depends on the geographic area associated with the customer.

12. The system of claim 11 wherein said formatted markup information is generated at the computer system without further communication from the server system.

13. The system of claim 11 wherein said request corresponds to an HTTP request and said response corresponds to an HTTP response generated in response to said HTTP request.

14. The system of claim 11 wherein the formatted information is formatted according to a standard generalized markup language (SGML).

15. The system of claim 11 wherein the formatted information corresponds to hypertext markup language (HTML) code.

16. The system of claim 11 wherein the instructions include instructions formatted in accordance with a scripting language.

17. The system of claim 16 wherein the scripting language is JavaScript.

18. The system of claim 11 wherein the instructions include JavaScript code, and wherein the computer system is further configured or designed to execute the JavaScript code on the data to thereby generate HTML data to be rendered for display on the computer system.

19. The system of claim 11 wherein the response information is not in a format which may be used by a browser application for rendering the response information for display on the computer system.

20. The system of claim 11 wherein the computer system includes a display device, and wherein the computer system is further configured or designed to render the formatted markup information, using a browser application, for display on the display device.

21. A computer system for generating formatted information for display, the computer system including at least one interface for communicating with a server system, the computer system comprising:

means for sending a request to the server system via the at least one user interface for displaying formatted markup information on the computer system;

means for receiving a response from the server system, the response including response information comprising instructions and data to generate formatted markup information for display on the computer system; and means for executing the instructions on the data to thereby generate formatted markup information for display on the computer system;

wherein the byte size of the instructions and data is less than the byte size of the formatted markup information, which, in turn, improves a response time of the computer system, and wherein means for sending further another request to the server system via the at least one interface for displaying additional formatted markup information on the computer system, wherein means for receiving further receives, instead of the additional formatted markup information, another response from the server system, the another response including information comprising another set of data, which, when used by the instructions, generates the additional formatted markup information for display on the computer system; and wherein means for executing further executes the instructions on the another set of data to thereby generate the additional formatted markup information for display on the computer system, wherein the computer system is configured to facilitate ordering transactions of items selected by a customer, with the at least one interface being a customer interface, wherein the information received by the computer system includes information regarding an item for the customer to select by placing a customer order through the customer interface, wherein the customer order includes delivery timing information, wherein the customer is associated with a geographic area, and wherein at least one item for the customer to select to include the customer order depends on the geographic area associated with the customer.

22. The system of claim 21 wherein said formatted markup information is generated at the computer system without further communication from the server system.

23. The system of claim 21 wherein said request corresponds to an HTTP request and said response corresponds to an HTTP response generated in response to said HTTP request.

24. The system of claim 21 wherein the formatted information is formatted according to a standard generalized markup language (SGML).

25. The system of claim 21 wherein the formatted information corresponds to hypertext markup language (HTML) code.

26. The system of claim 21 wherein the instructions include instructions formatted in accordance with a scripting language.

27. The system of claim 26 wherein the scripting language is JavaScript.

28. The system of claim 21 wherein the instructions include JavaScript code, and wherein the system further executes the JavaScript code on the data to thereby generate HTML data to be rendered for display on the computer system.

29. The system of claim 21 wherein the response information is not in a format which may be used by a browser application for rendering the response information for display on the computer system.

30. The system of claim 21 wherein the computer system further renders the formatted markup information, using a browser application, for display on the computer system.

31. A computer program product for generating formatted information for display on a computer system, the computer system including at least one interface for communicating with a server system, the computer program product comprising:

a computer-readable storage medium having readable code embodied therein, the computer readable code comprising:

a computer code for sending, by the computer system, a request to the server system via the at least one user interface for displaying formatted markup information on the computer system;

a computer code for receiving, by the computer system, a response from the server system, the response including response information comprising instructions and data to generate formatted markup information for display on the computer system; and a computer code for executing, by the computer system, the instructions on the data to thereby generate formatted markup information for display on the computer system;

wherein the byte size of the instructions and data is less than the byte size of the formatted markup information, which, in turn, improves a response time of the computer system, and wherein the computer code for sending further sends, by the computer system, another request to the server system via the at least one interface for displaying additional formatted markup information on the computer system, wherein the computer code for receiving further receives, by the computer system, instead of the additional formatted markup information, another response from the server system, the another response including information comprising another set of data, which, when used by the instructions, generates the additional formatted markup information for display on the computer system; and wherein the computer code for executing further executes the instructions on the another set of data to thereby generate the additional formatted markup information for display on the computer system, wherein the computer product is configured to facilitate ordering transactions of items selected by a customer, with the at least one interface being a customer interface, wherein the information received by the computer system includes information regarding an item for the customer to select by placing a customer order through the customer interface, wherein the customer order includes delivery timing information, wherein the customer is associated with a geographic area, and wherein at least one item for the customer to select to include the customer order depends on the geographic area associated with the customer.

32. The computer program product of claim 31 wherein said formatted markup information is generated at the computer system without further communication from the server system.

33. The computer program product of claim 31 wherein said request corresponds to an HTTP request and said response corresponds to an HTTP response generated in response to said HTTP request.

34. The computer program product of claim 31 wherein the formatted information is formatted according to a standard generalized markup language (SGML).

35. The computer program product of claim 31 wherein the formatted information corresponds to hypertext markup language (HTML) code.

36. The computer program product of claim 31 wherein the instructions include instructions formatted in accordance with a scripting language.

37. The computer program product of claim 36 wherein the scripting language is JavaScript.

38. The computer program product of claim 31 wherein the instructions include JavaScript code, and wherein the computer program product further comprises computer code for executing the JavaScript code on the data to thereby generate HTML data to be rendered for display on the computer system.

39. The computer program product of claim 31 wherein the response information is not in a format which may be used by a browser application for rendering the response information for display on the computer system.

* * * * *

UNITED STATES PATENT AND TRADEMARK OFFICE

CERTIFICATE OF CORRECTION

PATENT NO. : 7,240,283 B1
APPLICATION NO. : 09/792400
DATED : July 3, 2007
INVENTOR(S) : Paila et al.

It is certified that error appears in the above-identified patent and that said Letters Patent is hereby corrected as shown below:

Claim 1:

Col. 8, line 14, "sending, by the computer system," should be --receiving, by the computer system,--

Col. 8, line 16-17, "data to generate formatted markup" should be --data to generate the formatted markup--

Col. 8, line 56, "include the customer order" should be --include in the customer order--

Claim 11:

Col. 9, line 22, "display, the computer comprising:" should be --display, the computer system comprising:--

Col. 9, line 32, "to a response from" should be --to receive a response from--

Col. 9, line 44, "computer system, and" should be --computer system,--

Col. 9, line 46, "sending another request" should be --send another request--

Col. 9, line 50, "receiving another response from" should be --receive another response from--

Col. 10, line 4, "include the customer order" should be --include in the customer order--

Claim 21:

Col. 10, line 44, "at least one user interface" should be --at least one interface--

Col. 10, line 47, "data to generate formatted markup" should be --data to generate the formatted markup--

Col. 10, line 56, "computer system, and" should be --computer system,--

UNITED STATES PATENT AND TRADEMARK OFFICE
CERTIFICATE OF CORRECTION

| | | |
|---|---|---|
| PATENT NO. | : 7,240,283 B1 | |
| APPLICATION NO. | : 09/792400 | |
| DATED | : July 3, 2007 | |
| INVENTOR(S) | : Paila et al. | |

It is certified that error appears in the above-identified patent and that said Letters Patent is hereby corrected as shown below:

Claim 21 (cont.):

Col. 10, line 57, "wherein means for sending further another request" should be --wherein the means for sending further sends another request--

Col. 10, line 61, "wherein means for receiving further receives," should be --wherein the means for receiving further receives,--

Col. 10, line 67, "the computer system; and" should be --the computer system;--

Col. 11, line 1, "wherein means for executing further" should be --wherein the means for executing further--

Col. 11, line 17, "include the customer order" should be --include in the customer order--

Claim 31:

Col. 11, line 53, "having readable code" should be --having computer readable code--

Col. 11, line 56, "a computer code for sending," should be --computer code for sending,--

Col. 11, line 59, "a computer code for receiving," should be --computer code for receiving--

Col. 11, line 64, "a computer code for executing," should be --computer code for executing--

Col. 12, line 4, "the computer system, and" should be --the computer system--

Col. 12, line 16, "the computer system, and" should be --the computer system--

Col. 12, line 22, "wherein the computer product is" should be --wherein the computer program product is--

UNITED STATES PATENT AND TRADEMARK OFFICE
CERTIFICATE OF CORRECTION

PATENT NO. : 7,240,283 B1
APPLICATION NO. : 09/792400
DATED : July 3, 2007
INVENTOR(S) : Paila et al.

It is certified that error appears in the above-identified patent and that said Letters Patent is hereby corrected as shown below:

Claim 31 (cont.):

Col. 12, line 35, “include the customer order” should be --include in the customer order--

Signed and Sealed this

Thirty-first Day of March, 2009

JOHN DOLL
*Acting Director of the United States Patent and Trademark Office*

UNITED STATES PATENT AND TRADEMARK OFFICE

CERTIFICATE OF CORRECTION

PATENT NO. : 7,240,283 B1
APPLICATION NO. : 09/792400
DATED : July 3, 2007
INVENTOR(S) : Paila et al.

It is certified that error appears in the above-identified patent and that said Letters Patent is hereby corrected as shown below:

Claim 31

Col. 11, line 56, “at least one user interface” should be --at least one interface--

Signed and Sealed this

Ninth Day of June, 2009

JOHN DOLL

*Acting Director of the United States Patent and Trademark Office*